United States Patent
Borowski

(10) Patent No.: US 9,560,339 B2
(45) Date of Patent: Jan. 31, 2017

(54) 3D LANDSCAPE REAL-TIME IMAGER AND CORRESPONDING IMAGING METHODS

(75) Inventor: André Borowski, Genève (CH)

(73) Assignee: FASTREE3D S.A., Ecublens (CH)

( * ) Notice: Subject to any disclaimer, the term of this patent is extended or adjusted under 35 U.S.C. 154(b) by 475 days.

(21) Appl. No.: 13/995,765

(22) PCT Filed: Dec. 21, 2011

(86) PCT No.: PCT/EP2011/073688
§ 371 (c)(1),
(2), (4) Date: Jul. 25, 2013

(87) PCT Pub. No.: WO2012/085152
PCT Pub. Date: Jun. 28, 2012

(65) Prior Publication Data
US 2013/0300840 A1    Nov. 14, 2013

(30) Foreign Application Priority Data
Dec. 23, 2010 (EP) .................................... 10196759

(51) Int. Cl.
*H04N 13/02* (2006.01)
*G01S 7/483* (2006.01)
(Continued)

(52) U.S. Cl.
CPC ........... *H04N 13/0253* (2013.01); *G01S 7/483* (2013.01); *G01S 17/89* (2013.01); *G01S 7/4817* (2013.01)

(58) Field of Classification Search
None
See application file for complete search history.

(56) References Cited

U.S. PATENT DOCUMENTS

| 4,229,103 A | 10/1980 | Hipp |
| 6,600,553 B1 | 7/2003 | Stone |

(Continued)

FOREIGN PATENT DOCUMENTS

WO    2009139971 A2    11/2009

OTHER PUBLICATIONS

Baiano, Alessandro, "Single Grain TFTs for High Speed Flexible Electronics", Delft University of Technology, 2009.
(Continued)

*Primary Examiner* — Christopher S Kelley
*Assistant Examiner* — Kaitlin A Retallick
(74) *Attorney, Agent, or Firm* — Young & Thompson

(57) ABSTRACT

A 3D landscape real-time imager, and method for operating such an imager, where the imager includes:
at least one illuminating part which is designed to scan at least a portion of the landscape at a given range and having an ultra-short laser pulse source emitting at least one wavelength, and an optical rotating block, with a vertical axis of rotation, and controlled such that given packets of pulses are shaped in a pattern of rotating beams sent toward the at least partial landscape; and
at least one receiving part which includes a set of SPAD detector arrays, each arranged along a vertical direction and rotating at a given speed in synchronism with the optical rotating block of the illuminating part, the detection data of the SPAD detector arrays being combined to acquire 3D imaging data of the at least partial landscape in a central controller.

36 Claims, 7 Drawing Sheets

(51) Int. Cl.
 *G01S 17/89* (2006.01)
 *G01S 7/481* (2006.01)

(56) References Cited

U.S. PATENT DOCUMENTS

| | | | |
|---|---|---|---|
| 2002/0033818 A1 | 3/2002 | Lin | |
| 2002/0143506 A1* | 10/2002 | D'Aligny | G01B 11/002 703/6 |
| 2002/0186976 A1* | 12/2002 | Seo | G03B 17/48 396/429 |
| 2003/0122955 A1* | 7/2003 | Neidrich | G02B 23/02 348/340 |
| 2003/0227845 A1* | 12/2003 | Park | G11B 20/225 369/53.19 |
| 2006/0041199 A1* | 2/2006 | Elmaleh | A61B 5/0071 600/478 |
| 2006/0153045 A1* | 7/2006 | Lee | B82Y 20/00 369/112.27 |
| 2006/0192086 A1 | 8/2006 | Niclass et al. | |
| 2006/0203344 A1* | 9/2006 | Miura | G02B 6/29311 359/566 |
| 2007/0014551 A1* | 1/2007 | Fujisawa | G03B 37/02 396/20 |
| 2007/0053040 A1* | 3/2007 | Sakaue | G02B 26/10 359/204.1 |
| 2007/0167813 A1* | 7/2007 | Lee | A61B 8/12 600/459 |
| 2007/0182949 A1* | 8/2007 | Niclass | G01C 3/08 356/3 |
| 2010/0142757 A1* | 6/2010 | Sandstrom | G02B 26/105 382/100 |
| 2010/0309288 A1* | 12/2010 | Stettner | G01S 17/023 348/43 |

OTHER PUBLICATIONS

Staszewski, Robert Bogdan, "Digital Deep-Submicron CMOS Frequency Synthesis for RF Wireless Applications", University of Texas at Dallas, 2002.
Charbon et al., "SPAD Sensors Come of Age", OPN Optics & Photonics News, pp. 34-41, 2010.
Gersbach et al., "A Low-Noise Single-Photon Detector Implemented in a 130 nm CMOS imaging process", Solid-State Electronics, 2009, vol. 53, pp. 803-808.
Girod et al., "Principles of 3D Image Analysis and Synthesis", Springer, 2002, pp. 1-12.
Itzler et al., "Geiger-mode Avalanche Photodiode Focal Plane Arrays for 3D LIDAR Imaging", Imaging and Applied Optics Technical Digest, OSA Technical Digest, 2011.
Niclass et al., "A Single Photon Avalanche Diode Array Fabricated in Deep-Submicron CMOS Technology", Proceedings of the Design Automation Test in Europe Conference, 2006, vol. 1, No. 3, pp. 1-6.
Staszewski et al., "1.3 V 20 ps Time-to-Digital Converter for Frequency Synthesis in 90-nm CMOS", IEEE Transactions on Circuits and Systems—II: Express Briefs, vol. 53, No. 3, Mar. 2006, pp. 220-224.
Staszewski et al., "All-Digital Frequency Synthesizer in Deep-Submicron CMOS", Hoboken, NJ: Wiley-Interscience, 2006, pp. 1-14.
Staszewski et al., "Event-Driven Simulation and Modeling of Phase Noise of an RF Oscillator", IEEE Transactions on Circuits and Systems—I: Regular Papers, 2005, vol. 52, No. 4, pp. 723-733.
Warburton, Ryan Ellis, "Infrared Time-Correlated Single-Photon Counting", Heriot-Watt University, 2008, pp. 1-157.
International Search Report, dated Mar. 15, 2012, from corresponding PCT application.
European Search Report, dated Aug. 26, 2011, from corresponding European application.

* cited by examiner

3D LANDSCAPE REAL-TIME IMAGER AND CORRESPONDING IMAGING METHODS

TECHNICAL FIELD

The present invention relates to a 3D landscape real-time imager. It also relates to methods for operating such an imager.

BACKGROUND OF THE INVENTION

Some 3D imagers exist today. An example of such a prior art is WO-2009139971 (A2), entitled "COMPUTER VISION-BASED MULTI-TOUCH SENSING USING INFRARED LASERS". Another patent application US-A-2002033818, entitled "Three-dimensional relative positioning and tracking using LDRI" teaches the use of a laser to illuminate a target and then to acquire an enhancement of the imagery produced on the basis of such an illumination. Such 3D imagers are also described in a textbook entitled 'Principles of 3D image analysis and synthesis', Bernd Girod, Günther Greiner, Heinrich Niemann, (Chapter 1.2), Kluwer 2002. Such 3D imagers have a very high depth accuracy. They are mostly limited in their characteristics of speed of acquisition and measurement distance. They all require that no or very few light pulses are emitted before another previously emitted pulse is received and measured. This limitation arises from the risk of confusion of pulses if multiple pulses are on the way between transmitter and receiver at one time. Also, high repetition rate pulses may lead to problems if common optics are used for the emission and reception of pulses, because optical elements may cause partial reflections of pulses. The measurement distance of such devices is limited by the low energy of the pulses they use to maintain eye safety. They then use multiple low-power pulses separated by large time intervals and then average the results to measure a distance for a 3D pixel. Such techniques are not suitable for obtaining fast landscape imaging. In such a technique, a 3D imager should be able to scan the surroundings in nearly all directions.

In other technical fields, some devices are using light at 1.5-μm near-infrared (NIR) wavelength. They are mainly long distance rangefinders or airborne lidars using the relatively eye-safe properties of that wavelength region, as such light is absorbed in the eye's lens. However, it is not possible to generate an image on the basis of such a lidar with a high resolution, at all ranges. Further, the time to acquire a complete frame of the scene is long, especially when the scanned scene is a complete landscape.

SUMMARY OF THE INVENTION

Therefore, there is a need for a 3D landscape real-time imager having enhanced speed, distance and resolution capabilities.

To this aim, the present invention provides a 3D landscape real-time imager which comprises:
  at least an illuminating part which is designed to scan at least a portion of the landscape at a given range and having an ultra-short laser pulse source emitting at least one wavelength, and an optical rotating device, with a vertical axis of rotation, and controlled such that packets of pulses are shaped in a pattern of rotating beams sent toward the said at least partial landscape;
  at least a receiving part which comprises an optical rotating device, with a vertical axis of rotation, which carries a set of SPAD (single photon avalanche diode) detector arrays, where the diodes are arranged along the vertical direction, and the optical rotating device of the receiving part is rotating in synchronism with the optical rotating device of the illuminating part and the receiving part comprising also a means for combining data acquired with the SPAD detector arrays according to the various rotations of the two optical rotating devices to obtain 3D images of the said at least partial landscape in a central controller.

In another aspect of the present invention, the 3D real-time landscape imager comprises additional means for vertical scanning of the landscape and/or vertically stacked sensors to achieve a high vertical resolution.

In another aspect of the present invention, at least one of the two optical rotating devices of the 3D landscape imagers comprises a rotating polygonal mirror.

In another aspect of the present invention, at least some faces of the rotating polygonal mirror have different surface shapes, to acquire data on a limited part of the 360° landscape.

In another aspect of the present invention, the 3D real-time landscape imager comprises means for combining 3D data with 2D data acquired in parallel.

The present invention also relates to a Set of 3D real-time landscape imagers comprising 3D real-time landscape imagers. Such a set of 3D imagers comprises a central controller and a high-speed data link allows the communication of data streams between them and their central controller such that the 3D landscape imagers coordinate their "launching pulse agenda" to avoid simultaneous pulse reflection from the same targets points.

The present invention also relates to a method of operating such an imager which consists in:
  emitting at least one series of ultra-short power laser pulses per pixel of at least one wavelength, at a certain repetition frequency,
  forming multiple packets of pulses from said pulse series, the packets being separated by a given time duration;
  forming multiple beams which are sent to the landscape with different longitudinal focus positions;
  reflecting said formed beams of pulses from the landscape;
  receiving said reflected pulses onto at least one SPAD detector array, said SPAD detector arrays rotating in synchronism with the emission of said illuminating beams and being arranged to produce detected data on the basis of the measured round-trip delay of the pulses and using the precise timing of the pulse trains for efficiently detecting faint signals at each SPAD detector cell of the said SPAD detector arrays;
  processing said detected data to obtain 3D data.

In another embodiment, for each illuminating beam, the reference time of the pulse train is computed in accordance to the reference time provided by said illuminating part, from the addresses of the SPAD detector cells and/or the orientation of said beams.

In another embodiment, 3D data are very quickly acquired on the 360° landscape around at least one 3D landscape imager by quasi-simultaneous 3D data acquisition on the same landscape, each 3D landscape imager having different longitudinal focus positions and the various 3D data provided by the said 3D landscape images being combined to a single landscape.

In another aspect of the invented method, the device illuminates quickly rotating vertical lines in the landscape with ultra-short, ultra-high peak power infrared light pulse trains. The reflected photons are efficiently detected on linear arrays of ultrafast SPAD sensors at gigahertz pulse repetition frequencies.

In another aspect of the invented method, the acquisition step comprises the step of receiving the reflected light through the use of several diffusers on top of the SPAD detectors.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

The Detector Used in the 3D Real-Time Landscape Imager

In another patent application filed the same day by the same applicant and entitled "Methods and devices for generating a representation of a 3D scene at very high speed", a new device based onto a SPAD detector array has been described. Such a device comprises a plurality of photodiodes operating above the breakdown voltage, known as Single Photon Avalanche Diodes. Such diodes are capable of detecting single photons at very high speed thanks to an avalanching process that provides significant carrier amplification with a timing resolution of a few picoseconds.

In the aforementioned patent application, a process to build an IR SPAD diode has been described based on a Ge layer which is grown or deposited on a CMOS integrated circuit. The Ge layer is deposited onto a well, the dimensions of which are favorable to trap single and multiple photons at a given wavelength or multiple wavelengths. The SPAD is coupled to a quenching circuitry integrated in CMOS that performs the detection of avalanche currents, converting them into digital signals that are in turn processed on chip and off chip. This triggering electrical signal contains the essential data onto which the imager operates.

The CMOS integrated circuit which is on the same substrate as the SPAD detector of the basic imager is built so that the various electronic circuits needed to process the data based onto the detected events (cells) are acting together to provide a global electric signal representing the complete acquisition of 3D data to a display or other application devices. This vertically built diode and CMOS processing circuits is repeatedly implemented:

Such detector elements can either be arranged in a single dimension to provide a 1D linear array for a SPAD detector array or equivalent;

Alternatively, detectors can be arranged in a two-dimensional array to provide a 2D SPAD detector array in a matrix form.

The invented imager with enhanced speed, distance, and resolution capabilities uses mostly a line equivalent with an array form of the aforementioned SPAD detector arrays. Notably, it is provided a matrix form of the detectors based on the SPAD detector cells. However, the SPAD detector cells of the matrix form are clustered and their detection signals averaged such that only one dimension is provided.

Figure 1:
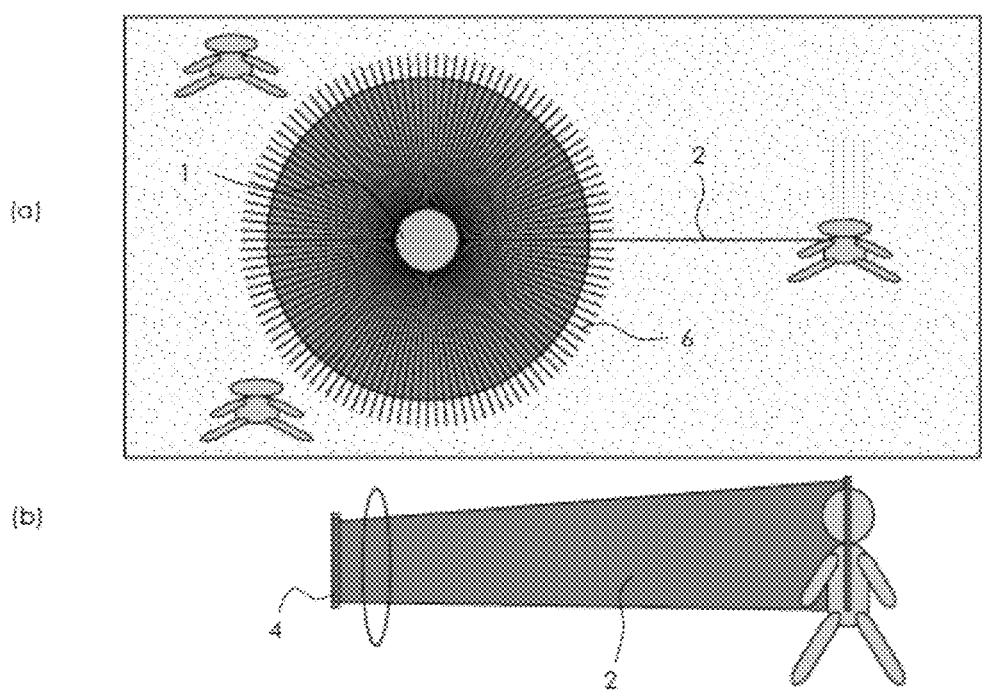
FIGS. 1(a) and (b) illustrate respectively a top view and a partial front view of a 3D real-time landscape imager.

In the FIGS. 1(a) and (b), an embodiment has been described of the 3D real-time landscape imager of the present invention. The 3D real-time landscape imager 1 of the present invention comprises means for capturing multiple successive "slices" of the virtual surrounding 3D sphere 6. The sphere is represented as a landscape image of the overall space around the imager 1. These slices 2 are parallel, differently focused vertical laser pulses illuminations, each slice being emitted through a distance-specific-optical setup to the virtual sphere around them. Each slice can be seen as a vertical array of pixels. The measured slices are acquired with multiple SPAD detector arrays which are rotating together. Due to its specific front optics, each SPAD detector array 4 is suitable for a different distance range of 3D data with high transverse resolution.

When a complete frame of measurement of the sphere around the imager has been completed, the data acquired with such a SPAD detector array are processed together and transmitted to other computing means with data indicating the slice which has been acquired.

The combination of the 3D data of all SPAD detector arrays generates a complete image of the landscape around the 3D real-time landscape imager's available field of view. To be able to acquire the overall slices dividing the sphere of the imaged landscape in real-time. The enhanced global speed of acquisition is a distinctive advantage of a 3D real-time landscape imager as described in the present invention.

The High Resolution Landscape Imagers

The imager comprises means for continuously capturing 3D data on the 360° landscape surrounding the imager. In a practical example, the 3D data of the landscape are captured in milliseconds in a range of a few tens of meters around the imager. The 3D data will be acquired in a folded (circular) rectangular format with a precision of relief in the millimeter range. The acquisition time of an average frame is in the millisecond to sub-second range. A movement estimation and compensation means is associated to the 3D real-time imager to allow the imaging of a real world with moving objects. An application is tele-monitoring of a site. The speed of 3D data capture is a decisive advantage of the imager of the present invention.

According to the present invention, two versions of the landscape imager are designed. In a simpler version, a given number of vertical points belonging to a angularly defined area are acquired, such that a limited fraction of the landscape sphere is imaged all around the imager. It is simply a rectangular flat image with an arbitrary starting point which is arbitrarily selected anywhere on the landscape. The two small ends of the rectangle are touching each other. The final 3D format of data comprises the overall rectangular flat images which recover the 360° landscape. The invention provides mixing of 3D data from several sensors at different focus points and from several imagers having different physical locations.

In a more sophisticated version, the beam position and imager direction will scan the vertical dimension with a resolution better than provided by the number of points of a single line array sensor in order to bring more detail in the vertical dimension. The simpler version will not be closely described. It will be somewhat similar to the sophisticated version but it lacks vertical elevation selection mechanisms.

The imager of the present invention comprises mainly two parts.

The first part of the invented imager is an illuminating part or illuminator, which emits a given set of angularly defined beams of light of at least one wavelength. Preferably, the laser pulses are in the infrared (IR) range, and are arranged in multiple pulse packets, each packet being time separated from the others by a determined delay. Their power is strictly controlled notably in view of a programmed strategy of illuminating the targets while preserving eye safety of the human beings which could be present in the field of view.

The second part of the invented 3D real-time landscape imager is a receiving part or a receiver which collects the reflected laser pulses from the reflective objects of the scanned landscape by means of the illuminating part. At least one SPAD detector array is placed in the optical path of an optical mechanism or optical rotating device to collect light from at least one complete frame of the landscape. The SPAD detector arrays are provided with local and global DSPs to generate a processed electrical signal which represents an image of the scanned landscape. That electrical signal can be transmitted to an applicative device such as a 3D display, or a CAD mesher for further processing.

Local DSPs are integrated on the same area as a SPAD and its quenching circuit, with a time-to-digital converter integrated into a SPAD detector cell. Each local DSP on a SPAD detector cell performs operations at the level of each event detected at the SPAD or SPAD cluster level. An important operation of the local DSP is the blanking (suppression) of some received light pulses in accordance with the control signals from the illuminating part of the 3D real-time imager.

Such a blanking (deactivation) allows a SPAD detector cell to process events by detecting a single photon or multiple photons from a given reflected pulse even when other illuminating pulses have been emitted by the illuminating part of the 3D real-time imager, but at a different focus on the illuminated landscape. The knowledge of the coarse position of the first illuminated reflective zone of the landscape during a first flash or train of light pulses allows the computation of time periods in which no significant reflected pulses are expected. These blanking intervals are used to activate only the relevant SPAD detector cells.

Local DSPs are integrated into clusters of several SPAD detector cells between neighboring SPAD detector cells. Such a cluster is programmed in size and shape to perform various operations mainly for multiplexing and averaging the detected events of the SPAD detector cells of the said programmed macro-cell that acts as the equivalent of a single "perfect" SPAD having no recovery time.

One or more global DSPs are integrated at the higher level into the complete SPAD detector array, notably to perform data compression before sending the detected data to an external processor, which is programmed to make use of the electrical signal detected and processed as it has been described above notably to combine data from multiple sensors in a complete 3D representation.

Note that the speed of acquiring a complete frame is so fast that a movement of at least some objects in the landscape can be detected. Such a movement is preferably detected by comparing two or more successive image frames with known image analysis software or directly inside the DSP (for on-chip data compression). When analyzed, the resulting characteristic parameters of such a movement can be used to compensate and correct the further acquisition of the following frames by means of a compensation mechanism. The compensation mechanism comprises software compensation of errors introduced by the relative movements of targets and sensor by estimating the movement of those targets, while the sensors acquires the 3D data. Such operations are data intensive and best done locally on board of the integrated circuit containing a SPAD detector array.

One embodiment of the imager is a landscape direct-detection imager which uses several elemental imagers linked to a smart controller. In a further embodiment, an elemental imager is configured as an independent smart imager.

Specification of an Independent Smart Imager

In an embodiment, a set of 3D landscape imagers is provided. Several imagers work together with a central controller. A high-speed data link allows the communication of data streams between them and their central controller. In a variant, an implicit cooperation is implemented through the detection of signals by other landscape imagers and automatic adaptation. In an embodiment, the central controller comprises a means for implementing of a rough, optically coupled, cooperation protocol using tagged packets. Each 3D landscape imager of the set is controlled such that the illuminator emits packet of pulses which are tagged. When a tagged packet is received at a receiver from one of the imagers of the set, the tagging of the received packet of pulses is decoded. Furthermore, the 3D landscape imagers should coordinate their "launching pulse agenda" to avoid simultaneous pulse reflection from the same targets points. To combine their 3D data (if needed), an explicit knowledge of their exact relative position is needed and is made available by the use of tagged packets containing information on the exact reference time (time-of-flight distance measurement). After some exchange of those reference time tagged packets, the relative position of each imager will be known with great precision and then a complete, multi-imager, 3D data description could be generated by a suitable type of controller. The central controller of the set of cooperating 3D landscape imagers comprises a means for controlling the illuminators of the connected 3D landscape imagers which generate tagged packets of laser pulses, a means for select corresponding reflected packets of pulses from each receiver of the cooperating 3D landscape imagers, and a means for combining the 3D data and for producing a global 3D image from the cooperating 3D landscape imagers on the basis of the various positions and orientations of the cooperating 3D landscape imagers.

Figure 2:
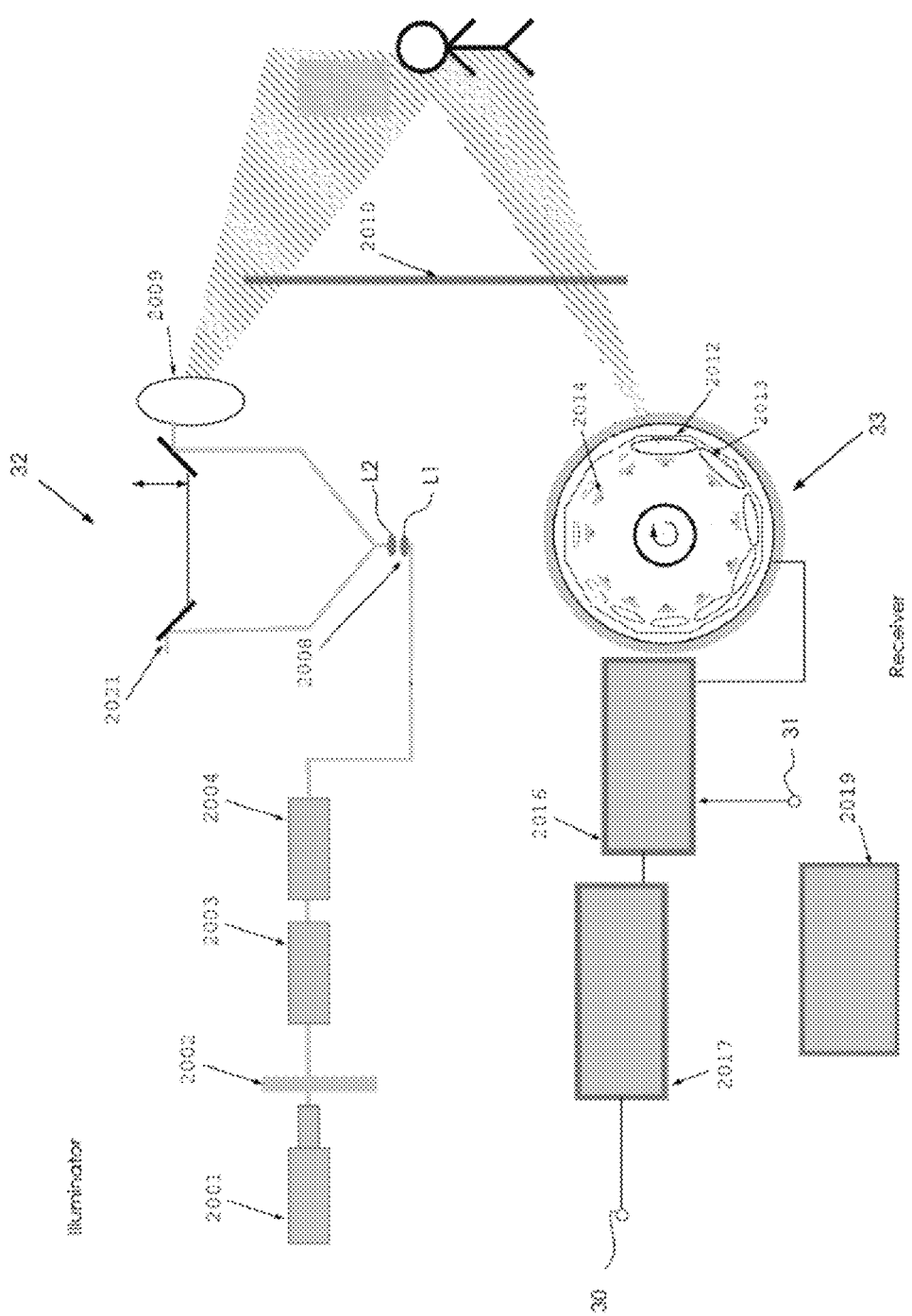
FIG. 2 is a block diagram of an embodiment of a 3D real-time landscape imager of the present invention designed for the long distances.

By reference to FIG. 2, each independent smart imager comprises a cylindrical enclosing box 2010 in metal with a circular glass opening for the active optical parts. A box's mechanism is powered and controlled by a copper or fiber cable link (Ethernet type) 30. In one embodiment, the external controller controls the data acquisition process by selecting angular ranges and distances of interest. It is also possible to let the imager work in standalone mode. The imager possibly launches optical pulses only (or mainly) in those directions of high interest. It could also decide the maximum emission power for safety and power control means. A control of the speed of rotation of the optical block or optical rotating device 32 is also provided. The box's mechanism is also optically linked by copper and optical fiber to the other independent smart imagers that are part of the same box or an independent box (not shown in FIG. 2).

An independent smart imager also comprises a first local electronic board 2016 supervising the real time management of the imager which is connected to the set of SPAD detector arrays settled in the optical rotating device 33/The first local electronic board 2016 is also connected to various sensors 31 mainly for detecting the instantaneous rotation of the two optical rotating devices 32 (at the illuminator) and/or 33 at the receiver. A second local electronic board 2017 is connected to the output of the first local electronic board 2016 and is sending the raw or semi-processed data generated at the local SPAD sensor array to an external smart controller by a link 30. The said external controller has the same function as the Ethernet controller. It uses the data for its proper operation or transfers them to others users.

The illuminating part of the smart imager comprises one or more mode-locked IR lasers 2001 emitting at several wavelengths around 1.5 μm and at several repetition frequencies in the GHz range. Each laser source is followed by a modulator 2002 which is able to suppress some or all pulses.

The modulator 2002 is controlled by fast electronics which can be programmed to generate variable and fixed packets of light pulses notably in synchronism with the generation of the various light beams. To shape the time series of pulses, the modulator 2002 is able to cancel one or more pulses generated at the laser source 2001.

The modulator 2002 lets through measurement pulses of variable length defined as a number of pulses. At predetermined times, the real-time controller 2016 controls the modulator 2002 to imprint tags on some packets of successive pulses; the tag information is encoded by removing some of the pulses. Between two successive continuous packets of pulses, one or more missing pulses are inserted following a programmed sequence. Such a void interval between two successive pulses provides a signature of the pulses ending before the void interval or starting after the void interval. Therefore, at the receiver side of the imager, it is possible to detect directly a time reference based on the detection of a given void interval in the faint light from the illuminated scene.

The real-time controller 2016 controls the number of modulation packets and the power of each light pulse by acting on the modulator 2002. Power control is performed by a power light amplifier 2003. The strategy is programmed into the controller 2016 to send a limited number of powerful pulses inside a measurement packet. In an example, 36 pulses are spaced at 100 ps. In a very short time, it is therefore allowed to discriminate the various echoes from the target at different distances from the imager. The number of pulses is selected to be large enough, however, to limit the individual pulse power onto a safety constraint and allow a strong enough time averaging on the SPAD receivers. The modulator 2002 is also under the supervision of a safety mechanism implemented onto the controller 2016 to limit the maximum light power launched on each angular part of the whole 360° landscape area.

The ultra-short (1 ps width) laser pulses are emitted in small groups or packets with large (at nanosecond- or tens of nanosecond-level) delay between packets. This arrangement of the programmed time series of pulses optimizes the power management and keeps the area of reflection (target area) as small as possible. The exact angular targeted pixel area could change a little at each rotation of the optical block in such a way as to scan slightly different horizontal part of the same target.

An optional semiconductor optical amplifier 2003 takes the input signal in the milliwatt range and amplifies it to the 10's of milliwatt range. It also manages most of the AGC required for the SPAD matrix non-saturated operation. An erbium optical amplifier 2004 amplifies the average power to the watt range.

The fast rotating optical device or block 32 with a simple two-lens optical joint 2008 splits unequally the amplified laser beam between the different emitter groups, each targeting the illuminated scene at a different depth. Due to the difference between the depth of each emitter, they do not need the same emitting power which is controlled on that basis of depth. The amplified laser beam is then directed through a rotating mirror to a cone-shaped fixed mirror of constantly variable elevation 2021. The cone-shaped fixed mirror 2021 is a slice of a cone mirror surrounding the rotating optical device 32 positioned at approximately the same dept as the sensors but behind the "sliced" lenses. Each emitter group has its proper range to scan the landscape. Therefore, each emitter group has its proper pulse power related to that depth of scanning.

In another embodiment, separate rotating optical joints for each beam are used to transfer the beams. The beams rotate with the block or optical rotating device 32. Further, a mobile mechanism also moves them up and down behind their designated lens. The lenses are fixed. Only the emitter and therefore the reflected laser beams, and receivers comprising the sensors and/or a small mirror, have to be moved up and down. The rotating lens group 2009, one out of 4 to 12, collimates the beam horizontally and makes it divergent at a particular angle vertically. Each optical assembly provides a range of distances around its horizontal beam focus where the beam will have its optimal shape, allowing for a high horizontal resolution of the measurements. The number of optical groups will be dependent on the size of the Rayleigh beam diameter: the smaller the size (i.e., the better the horizontal resolution), the larger the number of optical groups, as the Rayleigh length will be correspondingly smaller. The low requirement of collimation in the vertical direction will allow the use of truncated lenses. In a variant, the beam is not collimated at all in the vertical direction. The small beam moving up and down received from one side of the group will scan constantly its vertical angular direction in the other side. Such a small beam serves as a kind of virtual "viewing beam", indicating the direction from which light can be received Each rotating lens group will be optimized (collimated and diverged) for a particular distance. The result will be a complex multi-helicoid acquisition of the landscape.

In some cases, only a horizontally limited angle of interest is required to be scanned. Alternatively, some obstacle might be there, or a safety measure requires that a given angular range will not receive any laser beams. A mask operation is performed on the basis of an opto-electrical means of masking. Such a means comprises preferably a set of micro-mirror switches, the state of each one being controlled with a masking controller associated with the illuminating part of the smart imager of the present invention. The masking controller controls the micro-mirror switches to switch the beams on or off synchronously with the scanning of the landscape.

In another embodiment, the mask device comprises some fixed laser modulators to handle the distribution of the power in a particular angular range by switching on or off the beams to the emitter groups, inside the rotating block, in phase with the angular rotation of the block. If there is an obstacle in front of angular range from 30 to 62 degree or is there are no interesting targets there, the beams are stopped temporally in that direction.

In another embodiment, modulators control directly the power to be transferred independently to each rotating optical group from the fixed emitter part.

In another embodiment, separate laser emitters and erbium amplifiers (preferably in integrated form) are part of the rotating block or optical rotating device 32 and deliver light to each rotating optical group.

In order to maximize the reachable distance and the resolution and also to limit effects of the movements of the targets, a total optical block rotation can be done within in a time of a few milliseconds. To limit the total emitted power and keep it acceptable concerning eye safety, the 3D data acquisition (beam emission) occurs only in a limited number of rotations like one active rotation out of ten. A different regime could be used for different distance ranges, as shorter distances require less emitted power. The micro-mirror switches could be used for this management task.

In another embodiment, a further 2D sensor is used which works with the various SPAD detector arrays to produce a further 2D image with the 3D image. Landscape illumination for the optional 2D sensor is transmitted by the same two-lens optical joint or is provided independently. The separation of signals for the 2D and the 3D sensor is done by using different wavelengths, which can be separated with dichroic filters, with an independent beam transfer or by operating the 2D and 3D sensors alternately.

The receiving part is built into an independent enclosure 2010 and comprises another optical rotating device 33 as it will be discussed below. In another embodiment, the enclosure 2010 is combined with that of the illuminating part or illuminator to form a combined enclosure for the overall smart imager.

The receiving part also comprises a first 2016 and a second 2017 local electronic controller supervising the real-time operation of the smart imager. The first local electronic controller 2016 performs the real-time control of the modulator 2002, light amplifier 2003, and the various parts of the optical rotating device 33. It performs also the power management of the smart imager and the data transfer between the illuminating part and the receiving part, giving a time reference from the packets of emitted laser pulses to the receiving part, and also from the receiving part to the imaging device.

The second local electronic controller 2017 manages the security of the external links from the smart imager to the other imagers. This also includes techniques for reducing interference with background illumination based on maximization of the signal-to-background by use of blanking. It also includes reduction means of interference coming from other similar devices by use of a variety of techniques, including, but not limited to, pseudorandom scrambling of laser emission trains and frequency hopping.

The receiving part also comprises a rotating block 2012 which comprises multiple (e.g., 12) lenses 2013 adjusted for various focus and size, collecting simultaneously the faint light reflected from targets in several directions. The collected light from each lens is directed to a plurality of SPAD detector arrays 2014.

A SPAD detector array is built onto a chip and includes mainly a detector part and a processing part. The detector part comprises a set of SPAD detector cells which are arranged in a 2D rectangular matrix having a high ratio of height to width. In an embodiment, the 2D rectangular matrix is reduced to a linear 1D array of SPAD detector cells. If the second dimension contains more than one SPAD detector cell, they are clustered in macro-cells, as it has been previously described. A 1D linear array is thus realized. Each SPAD detector cell include the photon detector and its processing electronics comprising a Time to Digital converter TDC, local data processor of DSP type, data compressors, DSP. The chip comprises also a global DSP Processor. The several SPAD detector arrays and a RF 2018 wireless link are all integrated and placed close to the lenses.

In most cases, the receiver comprises at least an optical rotating device 33. It rotates synchronously with the optical rotating device 32 of the illuminator. The optical rotating device 33 is controlled such that the collected light from the illuminated scene or landscape is accumulated onto a given angle of rotation e.g. 360° at the receiver. Several collectors (e.g., 12) comprising lens/detector assemblies, work in parallel, each for a certain angular and focus range. In an embodiment, several emitter optics, with different focal points, are used sequentially, with the same type of receiving optics and detectors. In an embodiment, the emitter optics are organized in a symmetric way to help the mechanical balancing of the rotating block forming the receiving viewfinder. The resulting movement is a complex helicoid multi-depth acquisition of the landscape. The vertical position of the emitter optics changes in synchronization with the 2021 cone-shaped mirror. The 2025 block supports a position sensor and controls its horizontal position with a magnetic bearing. The centrifugal force will force the rotating block inside the bearing while a magnetic indexing "finger" moves it up or down.

Some of the SPAD sensors in the optical rotating device 33 could be replaced and/or combined with ultra-fast video sensors. The combination of 3D and video sensor (3D mapping) could provide efficient, human readable images. The 3D data and the data issued from the other sensors (IR, visible, UV) could possibly not be captured at the exact same rate and time. Landscape illumination and 2D data acquisition could occur during the inactive 3D rotations The rectangular chips (sensors) are not intended to receive the light from a complete image frame at one time, but only from a single vertical line as illuminated with the laser mounted above them.

An RF wireless or optical link is used for bringing power and data to the integrated circuit. An optional additional optical low-jitter link can possibly be used also to synchronize the TDCs.

The operation of the device is explained in the following:

The mode-locked IR lasers will continuously emit pulses at their natural repetition frequency of several GHz or tens of GHz.

The modulator will let pass through pulse packets of variable length; the modulator will also "imprint" tags on some packets by suppressing certain pulses. It will also be under the supervision of the security mechanism to stop the laser emission in case of mechanical problems. The safety requirements will be relaxed due to the large dispersion of the power in a large angular range. Some versions of the landscape imager will need stronger safety supervision and detection of living beings.

The light amplifiers will act continuously; they will also be controlled by the safety control mechanism, which will additionally provide the safety redundancy.

The electronic supervision system will supervise the two optical rotating devices and the modulators to have complete "landscape" data.

The measurement pulse will be launched at GHz frequency in groups of measurement packets (for each separate azimuth and range) to the target points and be reflected by each point.

Multiple optics will collect the light from a limited angular azimuth range and direct it to the SPAD detectors.

Inside the rectangular SPAD chips, there will be an intensive use of the blanking capabilities of the SPAD technology. This will be optimized to block any pulse reflected from the safety distance to the Rayleigh distance range chosen for this particular optical group of emitter receiver. In some cases (where many targets are closely spaced), a reduced emission or/and sampling frequency will be used to suppress strong "wrong distance" echo signals.

Each frame and each pixel of the 3D landscape will be individually identified by the electronics. The cell-level electronics on each SPAD detector array provides an absolute distance for each pixel.

The partial, helicoids, compressed data of each integrated chip of SPAD detector array is sent to the first real-time electronic board 2016. This board 2016 processes all the data to synthesize a 3D image of the landscape surrounding the imager.

The 3D acquisition process might be followed by a 2D acquisition process in the IR, UV or visible range. Between full 3D acquisitions, the 2D data will be combined with the high and low resolution 3D data to provide interpolated high-resolution texture mapped images to human supervisors.

Figure 3:
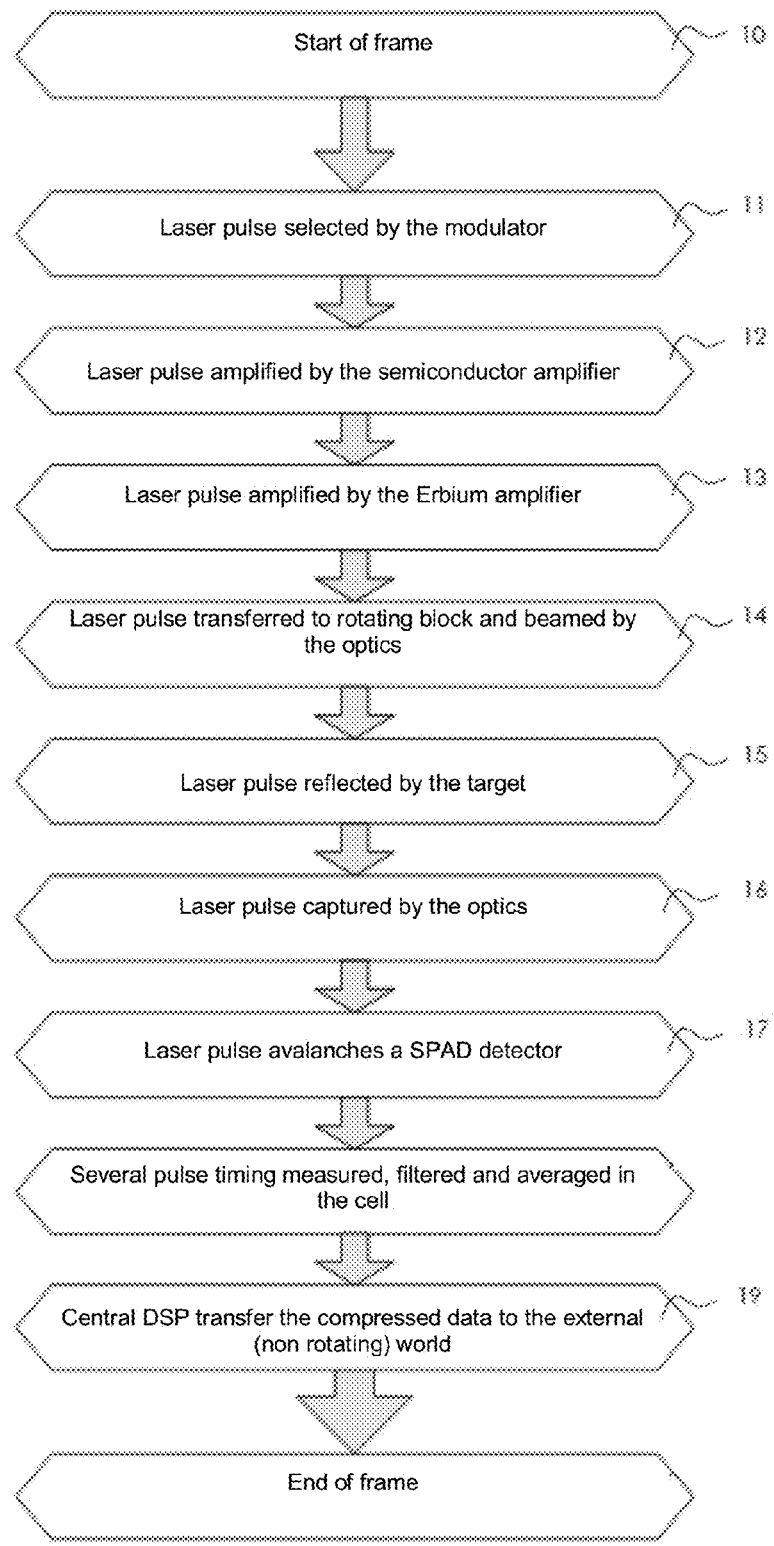
FIG. 3 is a diagram of the main operation of the 3D real-time landscape imager of the present invention.

FIG. 3 is a diagram illustrating the main operation of the 3D real-time landscape imager of the present invention.

At a first step 10, the device is initialized for the start of an image frame. A frame is ended when the complete data from the pulses reflected by the illuminated landscape have been acquired at least once. More acquisitions of some dots in the landscape are required due to various strategies of acquiring a frame at different resolutions. Initialization comprises any operations to prepare both the electronic circuits and the opto-mechanical devices used in both the illuminating part and the receiving part, and also comprises preparing the imaging application part connected and/or associated to the receiving part of the 3D real-time landscape imager.

At a second step 11, the electronic controller associated with the modulator selects at least one laser pulse or a packet of laser pulses provided by the laser source with a given (peak) power and/or frequency (repetition rate).

At a third step 12, the selected laser pulse is amplified by the semiconductor laser amplifier and then by the erbium amplifier.

At a fourth step 13, the amplified and selected laser pulse is shaped to form an illumination beam sent toward the landscape in predetermined directions both concerning elevation and azimuth by means of the optical mechanism on the illuminating part of the 3D real-time landscape imager under a programmed scanning pattern.

In a fifth step 15, the emitted laser pulse form the given illumination beam is reflected by a target in the illuminated landscape.

In a sixth step 16, the reflected laser pulse is captured by an optical mechanism onto the receiving part of the 3D real-time landscape imager.

In a seventh step 17, at least one photon from the reflected laser pulse received by the optical mechanism avalanches at least one SPAD detector cell of at least one SPAD detector array. The detection voltage which appears at the output of the respective SPAD corresponds to an event which is detected and then timestamped to measure the time of flight between the emitted laser pulse from which the event resulted and the SPAD detector, and therefore, the distance of the illuminated dot in the landscape which has been illuminated by a given illuminating beam of a known angular orientation.

In an eighth step 18, timestamp values are averaged for all the pulses which are related to the measurement pulse packet for a single dot. In that way, it is possible to more precisely deduce the depth of the reflecting dot, as the effect of random jitter of the SPADs is reduced. Such a computation is performed on the basis of averaging in time, but possibly also in space with neighboring SPAD detector cells.

In a ninth step 19, a central DSP of the receiving part of the 3D real-time landscape compresses data from the local DSPs having processed the detected events from every SPAD detector cell from the same received laser pulse packet.

Note that the illumination part does not have to wait until the last SPAD detector cell has reacted to the received laser pulse. A timestamp, according to the present invention is referenced to the first laser pulse of at least one packet of laser pulses that belong to a given illuminating beam, the angular orientation of which is known. Each laser pulse is only an alias of the first received pulse (which determine the "true" time of flight). The only use of those "alias" pulses is the greater precision they bring in the value of the "true" time-of-flight. The use of a common timestamp for all pulses part of the frame make this operation much easier and the electronics simpler to implement.

In step 20, the end of the frame is detected and the frame data are output to external devices. The data generated with the receiving part of the 3D realtime landscape imager are related to the coordinates of each illuminated dot of the landscape by combining both the timestamp of the received laser pulses, the angular definition of the illuminating beam from which the laser pulse belongs. The set of 3D and/or 20 coordinates which are obtained from the image sensors are combined at a means for generating received data with the number of photons which are averaged on an optional 20 receiving part. Thus, intensity information is combined with the 3D coordinates of each voxel of a 3D representation of the illuminated landscape. Such a representation can be used onto a 3D display, a 20 display with a graphical unit interface to select a point of view and/or a projection plane, or also a 3D meshed representation useful in a CAD environment.

Safety Concepts

The safety of the living "targets" is an essential constraint managed in the 3D real-time landscape imager of the present invention. The living "targets" comprise humans and moving or not moving objects that are staying in the illuminated landscape. Unfortunately, long-distance high-depth pixel resolutions require high-power pulses for illuminating the landscape. The IEC/EN 60825-1 (2007) norm defines the acceptable limits. The present invention gives a solution to the problem of the safety due to the high peak power pulses.

The invented solution of the safety problem is based on the same means as those used to enhance the speed and/or the resolution of the imaging. It is noticeable that it is not necessary to use all of the following means to solve the safety problem. The proper choice of means will depend on the circumstances. Further, the order in which the following means are recited is not mandatory.

A first means for a safety solution is based on the use of the 1.5-μm NIR wavelength which is known as relatively eye safe. Such a selection of wavelength range has become allowable due to the new Ge-based SPAD structure which has been described above.

A second means for a safety solution is based on the use of the shortest possible packets of laser pulses at the lowest possible energy. While determining the pulse packet formats and sequences, the central controller of the illuminating part of the 3D landscape imager takes into account the safety limitations in each zone of the illuminated landscape, mainly based on the knowledge whether or not a human being is present or not, when preceding frames of the landscape image have been acquired. Further, a count of the already radiated energy of the illuminating beams in each zone of the landscape is computed and, owing the aim of the illumination, the remaining energy budget is adapted. In a preferred embodiment, a limitation on the number of measurement packets per second in the same angular range belonging to a given area of the illuminated landscape is applied. This quantity is changed with the emitted power and then with the measured distance when it has been acquired.

A third means adjusts the total energy emitted to the size of a given illuminated surface area in the illuminated landscape. The real-time supervision of the emitted power is performed by an "independent" subsystem inside the 3D real-time landscape imager. This supervision subsystem controls the emitted power and also the movement of the mechanism in charge of the angular distribution of the packets of laser pulses. The supervision system acts onto the laser modulator and, in case of emergency, onto the light amplifier.

A fourth means performs a self-check of all security systems which are permanently active. When a failure of a security system is detected (i.e., when a complete coherent representation of the 3D landscape including relative movements of targets is not provided), a simple limitation of power and/or of energy of the laser pulses, separately or in packets, could not be efficiently managed, this triggers a default mode on the supervision system. In a preferred embodiment, the default mode of the supervision system is failure. The supervision system is ordering two commands of blocking the laser source, the modulator and the optical amplifier and/or orienting the viewfinder onto a safe zone in the landscape.

A fifth means performs the management of the whole transmitted energy in all wavelengths to the illuminated landscape at any given time. The emitted energy value at every angular orientation at every packet of pulses is added to a variable during a time period, preferably in one second, and is then compared to a memory stored threshold. The main strategy is to optimize the launching power in advance, but a control mechanism checks If the total emitted energy is higher than the stored threshold, the controller which commands the emitted power, reduces it during the following time periods.

A sixth means applies a limitation of the blanking mechanism to distances smaller than a minimum safety distance, like 3 meters or another small distance that would turn to be more appropriate. As it is not blanked, an intrusion is detected by the presence of any target in this small distance area. The large natural dispersion of the beam provides a safety margin for larger distances.

The reduction of all beam power in a limited angular range like 10° may be used when an intrusion is detected (this means a possible human presence); a possible approximate (0.5 meter) presence detection may also be used if the other measures are not capable of detecting a safety problem in this distance range.

Variants of Vertical Scanning Systems for the Fast Rotating Landscape Imager

Figure 4:
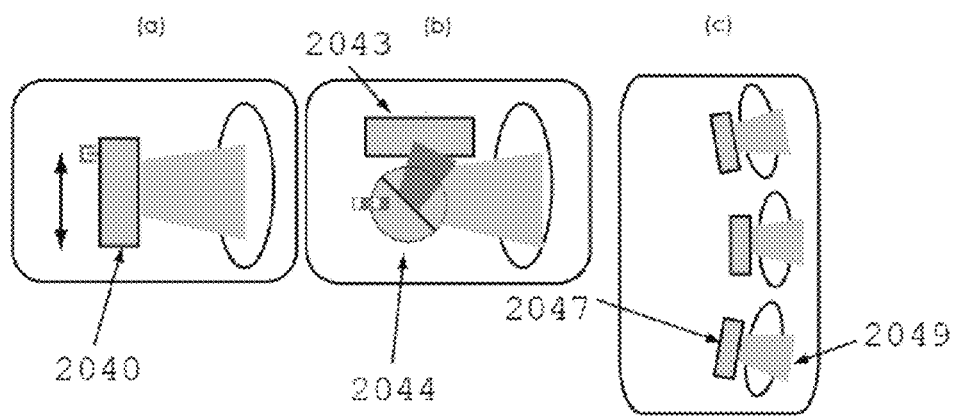
FIGS. 4(a) to (c) illustrates variants of vertical scanning systems in an embodiment of the 3D real-time landscape imager of the present invention.

Various systems are used to improve the vertical resolution of the landscape imager significantly, as it is represented at FIGS. 4(*a*) to (*c*).

In a Variant 0 (not shown), there is no vertical scanning. It is the simplest version which has some limited vertical resolution.

In a variant A shown at the FIG. 4(*a*), the vertical position of the SPAD detector array 2040 relative to the lens 2013 is changed in conjunction with the movement of the illuminating beam by means of an actuator controlled by the real-time controller 2016 (FIG. 3).

In a variant B, shown at the FIG. 4(*b*), a mirror 2044 is titled with its proper actuator (not shown) controlled by the real-time controller 2016 (FIG. 3), between the SPAD detector array 2043 and the lens 2013 in conjunction with the movement of the illuminating beam. The mirror is encapsulated in a support that will not change its center of mass during an angular movement. Its support and guidance are using air bearing and magnetic coupling to strongly limit any wear.

In a variant C shown at FIG. 4(*c*), several groups of optics and SPAD detector arrays like the pair 2049-2047 are positioned in such a way to acquire the 3D data of targets in a limited vertical angular range. No moving parts are used for the vertical movement. The number of captured pixels but is maximized.

Optical Rotating Joint

Figure 5:
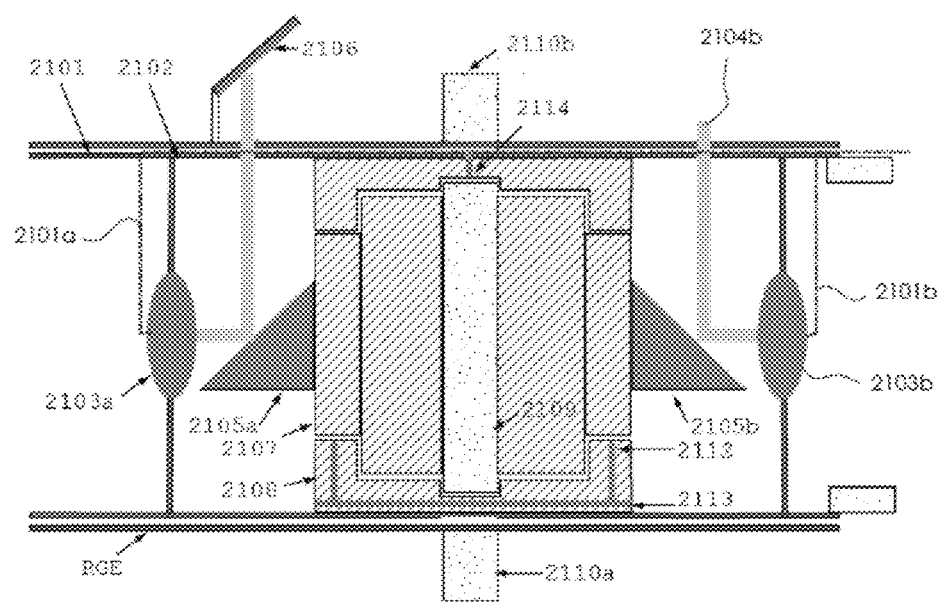
FIG. 5 is a schematic view of a mechanism adapted to generate at least an illuminating beam at the illuminating part of the 3D landscape imager of the FIG. 2.

At the FIG. 5, an embodiment of the optical rotating joint, like 2008 at the FIG. 2, in the illuminating part of the smart imager of the invention is shown which is an important link between the laser 2001 and the two amplifiers 2003 and 2004 and the fast rotating block which forms the angularly defined light beam toward the landscape to image. The optical path from the pulsed laser source 2001 to the erbium amplifier is made of an optical fiber having at least one core to conduct the formed packets of ultra-short power laser pulses.

In a first embodiment, schematically shown in the FIG. 2, a single link is needed to transmit a single optical light beam to the optical rotating device. A simple system with two lenses is designed and has been shown in FIG. 2. It comprises a first lens L1 which is fixed to the tip of the optical fiber OF at the output of the erbium amplifier 2004. A second lens L2 is provided which is fixed to the input aperture (not shown) of the rotating block. The second lens L2 is positioned above the first lens L1 to collect the ultra-short laser pulses from the tip of the optical fiber OF.

In another embodiment, the output of one mode-locked laser source signal is split into multiple beams (possibly transmitted through optical fibers). These beams are independently modulated and amplified for each emitter source. Therefore, it is important that a large flexibility I, terms of number of beams is given in transferring the beams to the optical rotating device 32 or block. The difficulty for transferring multiple laser beams to multiple rotating parts is the crossing between the rotating laser beams and the non-rotating "feeder" of laser signal.

The solution described in the FIG. 5 is to limit the crossing to a minimum, between a 1 mm size beam and perpendicularly a few hundred of millimeter diameter optical fibers. All the other crossings (mechanical power, electronic signals) have been removed. It is thus usable in this application and any others requiring the transfer of multiple laser beams (in both ways) between a fixed and a rotating part. The optical rotating joint of the embodiment shown at the FIG. 5 is mounted instead of the couple of lenses L1, L2 in FIG. 2, and several laser pulse generators like the series 2001-2004 are arranged around its axis of rotation.

The main optical component of the optical rotating joint is a small monogon mirror 2105 which is seen in FIG. 5 by its cross section 2105a and 2105b. The cylindrical mirror 2105 is rotating in front of a plurality of lenses like the lens 2103a or 2103b. The lenses 2103a, 2103b are arranged such that their optical axes are in a horizontal plane and intersecting the vertical central axis of rotation of the optical rotating joint. The lens 2103a receives from its back a laser signal from a branch 2101a from an optical fiber 2101. All the optical fibers 2101 run along the supporting glass tube 2102. Another lens 2103b is symmetrically shown in FIG. 5, with an optical fiber branch 2101b and its output 2104b. In another embodiment, the transfer of the laser signal is made inside a glass tube with ultra small engravings (not shown in the drawings).

Two monogon (or polygon) mirrors are supported at each end of an air bearing which has two parts:
  two fixed parts 2108, mounted at the lower base and at the upper cover and fixed to the static glass enclosure, each of them having a disk-shaped base on which an annular shape is fixed; and
  a rotating part 2107, disposed between the lower and upper fixed parts of the air bearing, which also has an annular part of the same diameter as that of the fixed parts 2108 to be fixed on them, and which is mobile around the common central axis of the static and mobile parts of the air bearing.

The air bearing is self-supporting with aero-dynamic means. The absence of a mechanical link to support the bearing is a key point for removing the crossings in common with the magnetic coupling.

In the embodiment shown in FIG. 5, the aero-dynamic means of the air bearing are based on the air pressure inside the static glass enclosure 2101 to sustain itself. The fixed part 2108 of the air bearing is channeled with grooves 2113 radially arranged around the central axis of the bearing. The grooves 2113 have openings at their ends which connect them to the interior air pressure of the static glass enclosure 2102.

Some vertical channels 2112 are arranged vertically at the outer of a cylindrical part of the static part 2108 of the air bearing, such that a free end of each vertical channel 2112 is connected to a radially disposed channel 2113. The other end of each vertical channel 2112 is free at the surface of the annular part of the static part 2108 of the air bearing. This arrangement ensures that the air pressure is equalized along the entire static glass enclosure. An opening 2114 from the center of the bearing through the static glass enclosure 2102 lets the air expand outside the bearings. An optional small turbine at one end of the system provides the required air pressure. In one embodiment, an air pressure sensor is mounted such that a control of the air pressure is made. To this end, a controller (not shown) is connected both to the pressure sensor and to the power of the air turbine to control the air pressure.

The air bearing is mechanically linked to an internal magnet 2109. This magnet is of a cylindrical shape aligned to the common central axis of the air bearing. It is magnetically linked to an upper external magnet 2110b and a lower external magnet 2110a, which are "glued" to a rotating glass enclosure RGE. The precise positioning of the magnets provides a way to align the azimuth of the beam with the optical lenses 2103a and 2103b.

A mirror 2106 is mechanically linked to the rotating glass enclosure RGE. It directs the beam to a second mirror (not shown). All those mirrors are aligned mechanically at the same elevation. This second mirror directs the beam in the direction of a viewfinder curved mirror. The viewfinder curved mirror directs the beam at the outside of the optical rotating device 32 of the illuminator (see FIG. 2).

Variants of Embedded/Rotating Laser Emitter for the Fast Rotating Landscape Imager In some version, the use of the optical rotating joint will not be desirable. The use of laser and erbium amplifiers in the rotating block can be used as an alternative. Some versions could use discrete components, but fully or partially integrated erbium amplifiers (possibly with the pumping diode) will be preferred.

Optic and Mechanic of the Landscape Long Distance Imager

The landscape imager will use high-speed rotation of the block to capture 2D and 3D data from the whole landscape around it. Considering the limited possibilities to successfully achieve any large change of focal distance at such high speed, the proposed solution is to use several optical groups composed each of an emitting part that will collimate the pulsed laser beams in one direction and spread it in the vertical direction (line illumination) and a receiver part that will collect the faint light reflected from the target. The system described here is mostly conceived for a distance range from 3 to 25 meters, but nothing precludes the adaptations for other distance ranges.

The instantaneous vertical resolution of the system will be limited by the resolution of the sensor, the beam power available and safety acceptable. To improve this resolution and improve also the efficiency of the optic system in the high resolution version, a vertical, slow scanning of the landscape will cover a limited angular vertical range (e.g., 10°). Another version will use separate optics and sensors for separate vertical angular ranges.

The natural horizontal angular range of the landscape imager is 360°. There are cases where obstacles limit the angular range of acquisition. Safety concerns may also require a limitation of the laser beaming, at least temporally, in limited angular ranges. The rotating optical joint will provide a separate beam for each optical group. It will then allow the control of the power beamed in each angular direction through the use of control on separate modulators and laser amplifiers.

The 3D real-time landscape imager of the present invention is programmed to operate in a large range of measurement distances while keeping the optical quality high and limiting the number of rotating groups.

The capture of such a range is realized around a 360° horizontal angular range of measurement and around plus or minus 15° of tilting on the elevation.

The control of the 3D real-time landscape imager is programmed such that a low latency acquisition of the whole landscape (at least in a limited vertical angular range) is achieved.

The use of the imager which is constantly rotating implies no wear nor maintenance requirement after billions of rotations of its rotating parts during several years To attain these objectives, opto-mechanical means are used.

In an embodiment, a group of emitters and receivers settled on top of each other's is provided, each group aiming in the same horizontal and vertical direction.

In an embodiment, multiple optical rotating joints are used to transfer the high power beams from the fixed part to the rotating parts.

In the logic of the invention, a systematic use of air bearings is made for most of the bearing function.

In an embodiment, a slow vertical movement of the beam behind the emitter optic is synchronized with the movement of the array sensor or scanning optics.

In an embodiment, a protection of the whole system in a sealed enclosure is provided possibly over-pressured with a neutral gas to avoid contamination of air bearing and optics.

According to an invented measure, a high precision, optical, low jitter, single reference point is detected at each rotation of the optical rotating device (32 and/or 33 in FIG. 2) and used for the speed control of the optical rotating device or block. A PLL is provided onto the controller of the optical rotating device of the illuminator and/or of the receiving part of the 3D landscape imager of the invention. It is designed to further lower the mechanical jitter. There is a requirement for a very precise knowledge of the angular position of the optical block. The mechanical inertia (constant speed for a single rotation) allows the control electronic to interpolate the exact angular present position of the optic beams based on the knowledge of the starting point (the reference point) and the elapsed time in nanoseconds or picoseconds since then. The interpolation exploiting the constant angular velocity due to the inertia is done on to provide the angular position of the rotating block during any elapsed time of 1 nanosecond or less. The interpolation is linearly based on the know rotation time.

Figure 6:
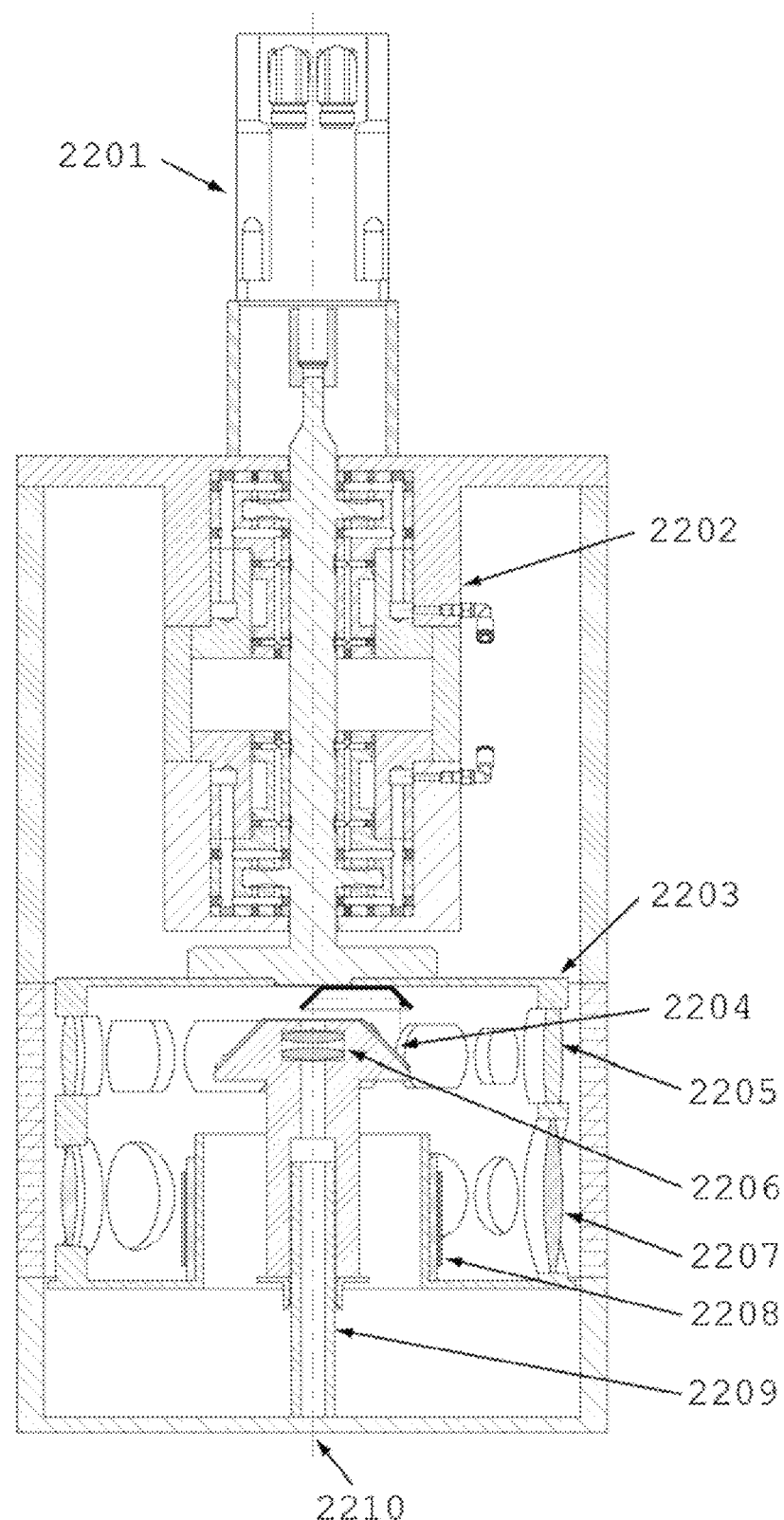
FIG. 6 is a block diagram of the optic and mechanic of an embodiment of a 3D real-time long distance landscape imager of the present invention.

The optics and mechanical construction of a landscape long distance imager according to the present invention has been shown according to a preferred embodiment in FIG. 6. In the embodiment of FIG. 6, both the optical rotating devices of the illuminating part and of the receiving part of the 3D real-time landscape imager of the invention are combined into a cylindrical enclosure.

In FIG. 6, a rotating motor 2201 is driving a cylinder 2203. An air bearing 2202 is supporting a shaft. Its central axis is aligned to that of the rotating motor 2201. A shaft, driven by the motor 2210 and supported by the air bearing 2202 carries the cylinder 2203. The device comprises mainly:

- a non-rotating conical mirror 2204 for scanning vertically the landscape with its up and down constant movements to;
- a set of emitting lenses 2205 collimating the laser pulses sent through the rotating optical joint to the landscape in the horizontal direction and spreading it in the vertical direction through an aperture of the cylindrical aperture of the enclosure;
- a simple optical joint 2206 for the laser beam linking the fixed and the rotating part of the illuminating part of the imager which receives the illuminating pulses from the light source (not shown) through the center of a voice-coil 2210 in which is engaged the tip of the output optical fiber of the illuminating source;
- a set of receiving lenses 2207 sending the faint laser pulse to the SPAD detector array which is associated to the said receiving lens;
- a corresponding set of array sensors 2208, each being associated to a receiving lens and which collects the faint pulses during a fraction of the horizontal rotation of the optical block (possibly vertically mobile, possibly positioned on a piezo sensor);
- a voice-coil 2209 moving the conical mirror 2204 and the sensors (or optical parts) under a controlled vertical scanning movement;
- an entry 2210 of the laser beam with a tip of the optical fiber of the laser source (see 2001-2008, FIG. 2).

The illuminating pulses from the output optical fibre of the light source are transmitted through the optical joint 2206. Through an aperture of the center of the conical mirror 2204, the light reflects onto a mirror which has the shape of a inversed cup with a first part reflecting horizontally (at the drawing) the light from the optical joint toward an opposite side to reflect the light onto the conical mirror 2204 and the illuminating beam is generated through the lens 2205 at a given angular and/or focus range. The rotation of the shaft ensures a scanning of the landscape.

The vertical movement up and down of the conical mirror 2204 ensures the vertical scanning of the illuminating beams. The same vertical movement up and down is also applied to the set of SPAD detector arrays 2208 which are mounted onto the same voice-coil 2209 than the conical mirror 2204. The "vertical" direction of the SPAD detector arrays 2208 is aligned onto the vertical axis 2210 of the combined optical rotating device. Both the motor 2201 and the voice coil are controlled by corresponding position and/or speed sensors (not shown) connected to a corresponding movement controller (not shown) which applies the tactical acquisition activity of the imager as it will be seen below.

Electronic Boards

The first and second real-time electronic boards (see 2016 and 2017, FIG. 2) manage simultaneously: the modulator (2002, FIG. 2), light amplifier (2003, FIG. 2), fast optical rotating device or block (32), viewfinder, RF link, integrated SPAD matrix with DSP processing, power management, internal data transfers, and temperature calibration.

Another board 2019 (see FIG. 2) manages: security, local and remote access, and external data transfer to the central controller through an Ethernet-like link. In case of mobile utilization, the board will also manage the emission and reception of differentiated tags on some pulse packets. Those tags will allow the various imagers working in the same area to limit collision by using wavelength switching (costly change of wavelength emitter) or "time sharing" the possible time windows between emitters strategy.

The first real-time electronic board (see 2016 at FIG. 2) manages the tactical acquisition activity of the imager as it is explained below on an example.

A program is selected at the start of the imaging step. First, the maximum ratio of power/precision of each beam during its rotation is settled by changing the command of the modulator (2002, FIG. 2) and the semiconductor amplifier (2003, FIG. 2). According to facilities of programming acquisition of a given landscape, more frequent pulses of limited power will bring higher precision. Less frequent pulses of maximum power will bring higher distance capabilities (limited by the optic focus ranges). Therefore, the real-time electronic board comprises a means for selecting a pulse frequency via the laser modulator (2001, FIG. 2) in accordance of a requested resolution at a command of the user of the imager.

The temporal spacing between packets of pulses is also an important parameter as it has been previously explained. Further, the real-time electronic board comprises a means for selecting a temporal spacing between packets of pulses according to a command parameter from the controller of the imager.

The optimum number of SPADs avalanching for each pulse is also controlled by the real-time electronics that may activate a minimum and a maximum number of SPADs by controlling the background illumination intensity. It should be remembered that each SPAD detector array comprises a plurality of SPAD detector cells. As it has been previously described, the data acquired on each SPAD detector cell are filtered and averaged in a group of SPAD detector cells, clustered in a macro-cell. Therefore, due to the too low power reflected by the illuminated landscape, the number of SPAD cells which are avalanching could be too low or too high (all SPAD could avalanche in a single shot) to compute a correct averaging. In such a case, real-time electronics is used as a means for alerting of an insufficient number of avalanching SPADs and for increasing the emitted power of the illuminating pulses by adjusting the pulse power through the semiconductor amplifier (2003, FIG. 2). The management of the pulse power could be done:

for all beams together;

for a group of lenses having a same focus; or for each direction of the illuminating beams, individually.

The actual level of packet density and power launched in the landscape will be adjusted by several parameters: rate of change of the landscape and presence of new significant items in the 3D field, precision requirement for the new items in the field (more details for people than for cars, for example, or vice versa), safety concerns, maximum electrical and optical power available.

The electronics will receive partial multi-helicoid, multi focus data from the SPAD integrated circuits that are attached to the fast rotating lenses (2207, FIG. 6). It will transform the partial data into a coherent synthetic 3D, with multi depths and pseudo-rectangular (folded rectangle) data representation.

The 3D Short Distance Landscape Imager

This imager will be used to capture the 3D data within an angular range of 90° horizontally and 30° vertically. Its main use will be in safety and security (smart presence detection/identification), automation and 3D interface (robotic and moving vehicles), ultrafast 3D human interaction with computer systems) and game fields. The 3D data of the landscape could be captured within a fraction of a second in a range of a few meters around the imager. The 3D data will be acquired in a folded (circular) rectangular format with a precision of relief in the millimeter range. The acquisition time of an average frame should be in the millisecond range. Movement estimation and compensation will be needed. The speed of 3D data capture is a decisive advantage of such an imager.

Figure 7:
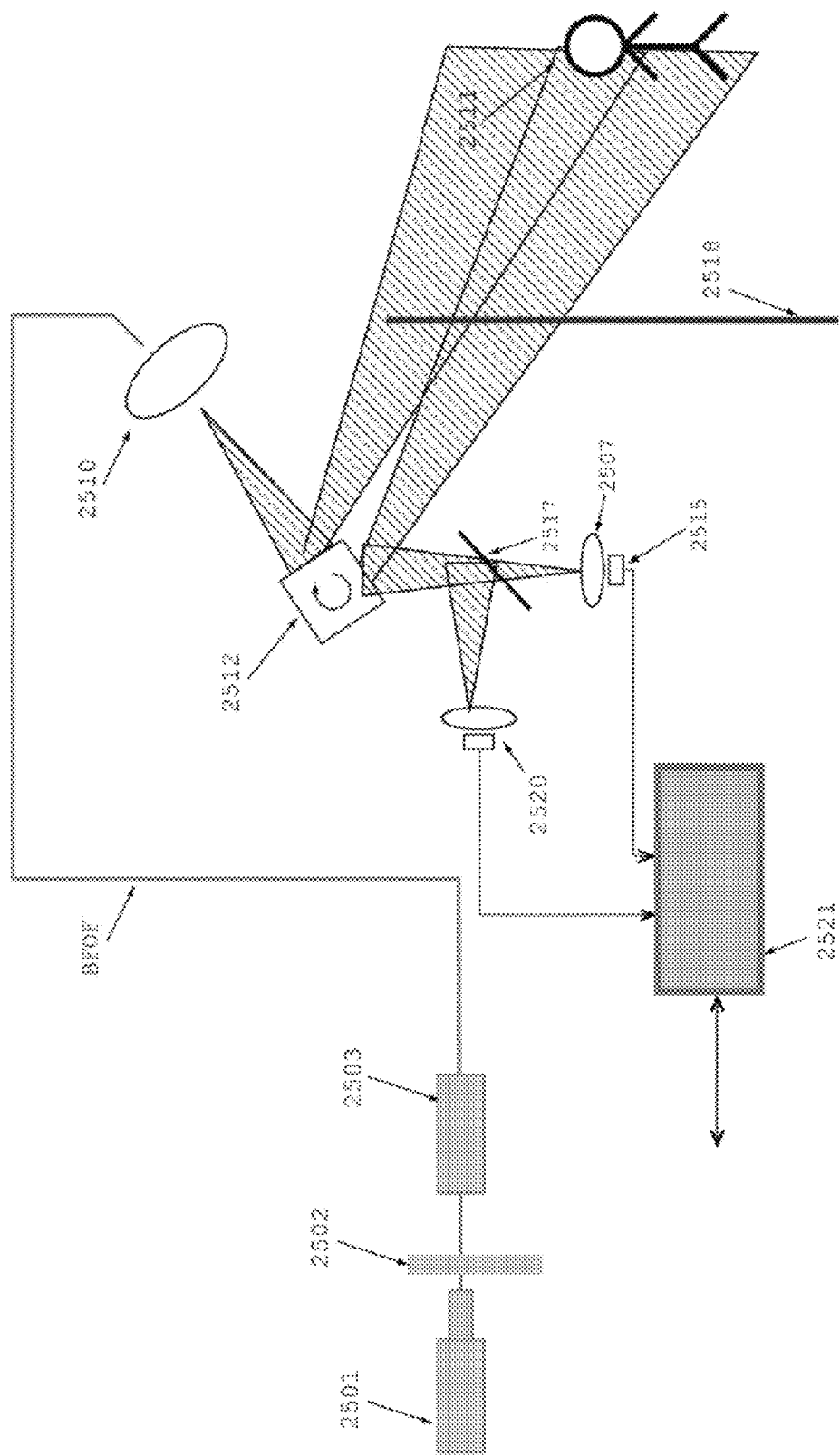
FIG. 7 is a block diagram of an embodiment of a 3D real-time landscape imager of the present invention designed for the short distances.

The interior scanner imager uses single imagers is described in the FIG. 7. An enclosing box 2518 of the interior scanner imager has a circular glass opening for the optical parts of the imager. These enclosing box's internal parts are powered and controlled by a copper or cable link (Ethernet or USB type) from a real-time electronic board 2521 of the type described at the FIG. 2 or 5. The local electronic board 2521 supervises the real time management of the sensor and sending the raw or semi-processed data to an external smart controller or PC (not shown) via an USB link.

The illuminating part of the 3D landscape imager of this embodiment is now described.

One or more mode-locked IR lasers, like the laser source 2501, emit at several wavelengths around 1.5 µm and at several repetition frequencies in the GHz range. Each one is optically coupled to a modulator 2502 able to suppress some or all pulses. The modulator 2502 is controlled by a fast electronic circuit (not shown) with a given program selected by a user application.

The modulator 2502 will let through measurement pulses of variable length (number of pulses). The real-time controller 2521 will use a strategy of combining the limitation of the number of measurement packets and power control of the light amplifier. The modulator 2502 is also under the supervision of the safety mechanism, already described, to limit the maximum power launched in the landscape.

An erbium optical amplifier 2503 amplifies the milliwatt signal at the output of the modulator 2502 to the Watt range. An optical fiber BFOF at the output of the erbium optical amplifier 2503 transmits the ultra-short power laser pulses, clustered in packets, each having a determined number of pulses, and two packets being temporally separated with a certain spacing. A free end of the optical fiber BFOF is optically coupled to a fixed lens 2510 which directs the generated pulses to a rotating optical block (complex polygonal mirrors).

The said optical rotating block is common to both the illuminating part and to the receiving part. This optical rotating block is designed to expand the beam formed at the fixed lens 2510 and made of the already described packets of ultra-short power laser pulses, in the vertical direction and collimate it horizontally.

The rotating optical block comprises a fast rotating, four (or other number) sides, tall polygon mirror 2512. The mirror 2512 directs the emitted beam from the fixed lens 2510 to the target 2511 through a glass opening of the glass enclosure 2518. The faint pulses reflected by the target 2511 get to a pair of SPAD detector arrays positioned on the other sides of the rotating mirror 2512.

The receiving part comprises a half-silvered mirror 2517 collecting the faint returning signal from the target 2511 and distributing it to two different focus optics, like the lens 2507.

Both the SPAD detector arrays 2515 and 2520 are identical. They are shaped as a single row of SPAD detector cells which are vertically aligned. Therefore, the row of SPAD detector cells is aligned parallel to the axis of rotation of the rotating mirror 2512.

Figure 8:
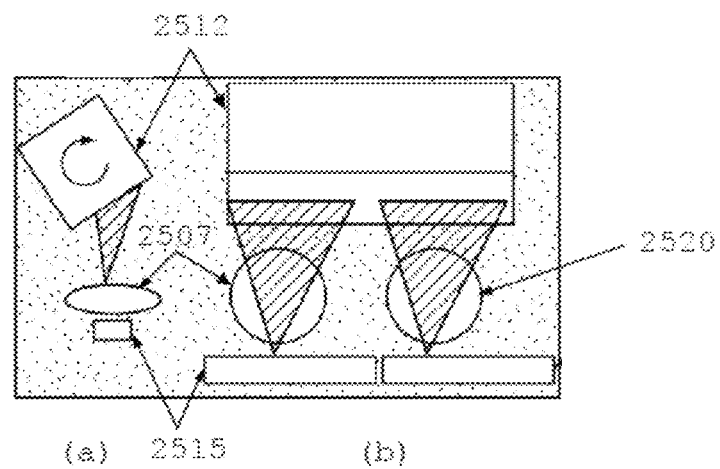
FIG. 8 shows two views of a part of the FIG. 7.

In another embodiment illustrated at the FIG. 8, the two SPAD detector arrays 2515 and 2520 are arranged one above the other in the direction of the vertical axis of the rotating mirror 2512. The drawing (a) in FIG. 8 is a schematic top view and the drawing (b) is a related schematic front view. The same elements than those in FIG. 7 carry the same reference numerals and are no more described.

The lenses 2507 associated to the SPAD detector array 2515, are associated to a means for setting the focus of the optics which is controlled with a special signal of the real-time electronic board 2521. The focusing optics is also covered by an IR filter (not shown) for removing maximum non useful light.

Each SPAD detector cell of the SPAD detector array comprises a SPAD photodiode (or equivalent) which collects the faint 1.5-µm IR photons on most of its surface. The SPAD detector cell comprises a means for capturing the time-of-arrival of at least a single photon from a reference time provided by the illuminating part as the time of emitting of the first pulse of a given packet of ultra-short laser pulses. Such a means comprises a fast counter which is built onto the same zone of the integrated circuit as the corresponding SPAD photodiode. This counter has a large dynamic range (more than 24 bits). It is reset at the reference time and starts to increment its value. As the event of the detection of at least a single photon by the SPAD (or the like) occurs, the 24-bit counter (part of it a time to digital converter) is latched for each pulse and the thus obtained count value is a so-called timestamp. Here, a timestamp is a value which represents the time of flight of the illuminating beam pulse train which has been reflected at a given dot of the target 2511. Knowing both the timestamp and the angular orientations of both the illuminating beam and of the reflected beam, a data point representing the 3D coordinates of the reflective dot of the target 2511 is computed.

To compute 3D coordinates of a reflective dot of the target 2511, a local DSP associated to the SPAD detector cell receives from rotation sensor (not shown) data representing the angular orientations of the illuminating beam and of the reflected beam from the target 2511. The angular orientations of the two beams are associated with the reference time of the illuminating packet of pulses by an association circuit, such that a photon detected at a SPAD detector cell and belonging at a given pulse train using a common timestamp can be related to the instantaneous angular rotations, and therefore the 3D coordinates can be derived.

The data detected at each SPAD detector cell of the SPAD detector array are directed to at least one macro-cell of a determined number of neighboring SPAD detector cells for filtering and averaging of the various collected data. Then, the averaged data are compressed, both with the 3D coordinates already described, on a global on-chip DSP following known algorithms.

A controller 2521 processes all the data from the two SPAD detector arrays 2515 and 2520, selects the relevant data and transfers them to external devices with a serial or Ethernet link, possibly to a personal computer or any embedded real time device controller to compute various 3D high-level data built from the relevant 3D data from the controller 2521.

The operation of the 3D short distance landscape imager is as follows.

The mode-locked IR lasers continuously emit pulses at their natural repetition frequency of multiple gigaHertz. The modulator transmits illuminating pulse packets of variable length. The modulator is controlled by the safety mechanism, which stops the laser emission in case of mechanical problems. The safety requirements will be relaxed due to the large dispersion of the power in the large angular range. The light amplifiers operate continuously.

The electronic supervision system supervises the rotating viewfinder and the modulators to have the complete "landscape" data.

The measurement pulse packets are launched at a frequency of tens of MHz (for each separate azimuth) to the target points and are reflected by each point of the target individually.

In an embodiment, it is provided a means for optical multiplexing the faint light from the scene. Such a means form optical multiplexing comprises an optical diffuser which is deposited onto the top of the active part of the SPAD detector array. The diffuser multiplexes the photons on individual SPAD detector cells to increase the maximum capture frequency.

The multiple optics like the lens 2507 capture the light of a determined angular azimuth range and direct it to the integrated SPAD SoCs.

Each frame, each pixel will be individually identified by the electronic circuits. The TDC's coupled with ultrafast counters will provide an absolute distance for each pixel.

The data of the SPAD SoC will be sent to the real-time electronic board.

This board processes all the data to synthesize a 3D image of the landscape surrounding the imager.

Optimal Use of the Polygon Mirror Faces

The fast rotating polygon mirror, like the rotating mirror 2512 in FIG. 7, could have each of its various face optimized for a different use. Its quick rotation let the emitters and sensors direct their attention on different part of the landscape at very short intervals, depending of the speed of rotation of the rotating mirror and on the number of the faces.

Figure 9:
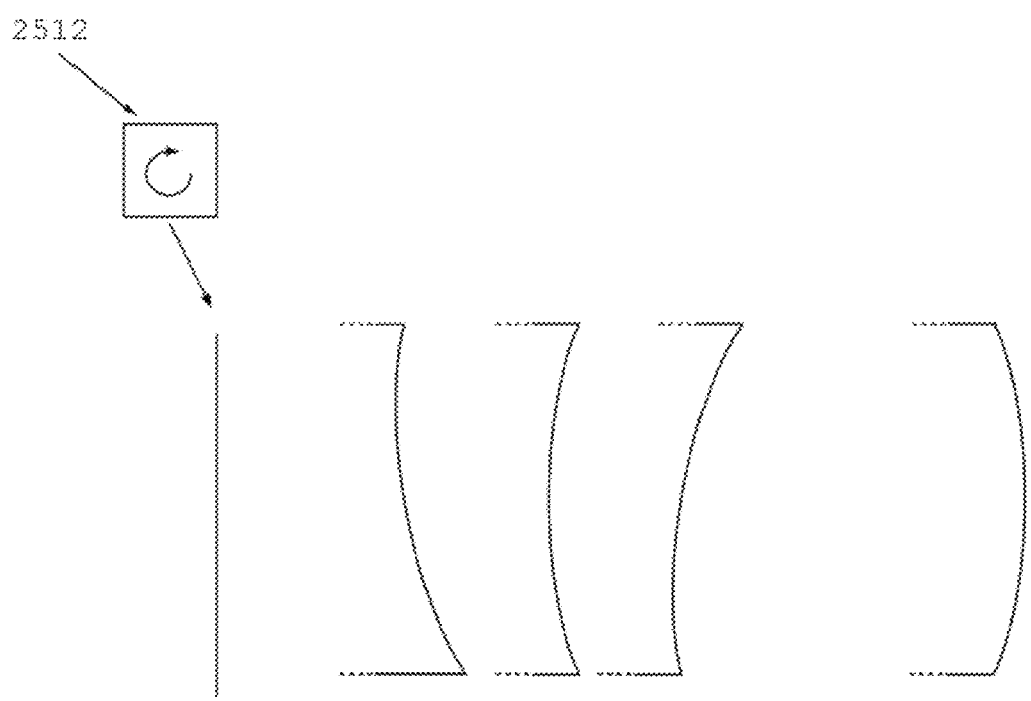
FIG. 9 illustrates some examples of shapes in an optical part of the embodiment of FIG. 7.

In FIG. 9, the mirror 2512 has four faces, labeled from A to D. Each has a predetermined curvature, such that a given area of the illuminated landscape corresponds to the face A to D which is in the field of view of the SPAD detector array. According to the sign of the curvature of the face, the mirror face may be concentrating (faces A to C in the FIG. 9) or dispersing (face D in the FIG. 9) the beam. Moreover, the central axis of the beam can be reflected at any different angles than the orthogonal axis in case of a flat mirror (at the left of FIG. 9).

Multi Stage and Controlled Atmosphere

A plurality of curved shapes could be stacked on top of each other on the same polygon axis. This will provide for a variety of directions/angle of view with the same matrix sensor. There will be an intensive task of 3D landscape reconstruction based on the knowledge of the polygon angular position (and thus exact shape in front of the sensor).

The whole polygon could be encapsulated in a protective cover with magnetic/air bearings on both sides to minimize the effect of dirt on the polygon/bearing maximize the speed (partial vacuum) and limit the noise.

Partially Reflecting Mirrors

Another form of optical multiplexing has been designed to enlarge the possibilities of the 3D real-time landscape imager. In an embodiment, the use of partially reflecting mirrors in the optical path lets the landscape imager acquire 3D data in several directions at the same time. The partially reflective mirror could have various reflecting shapes: stripes, angled stripes, small squares and so on. The separation between the two angular 3D landscape areas captured at the same time will be based on the exact angular position of the polygon (versus the partially reflecting mirror), the differences of time of flight between the two 3D targets and the internal coherence of each 3D data in time and space.

The invention claimed is:

1. A 3D real-time landscape imager, comprising:
at least an illuminating part configured to scan at least a portion of the landscape at a given range and having an ultra-short laser pulse source emitting at least one wavelength, and an optical rotating device, with a vertical axis of rotation, and controlled such that packets of pulses are shaped in a pattern of rotating beams sent toward the said at least partial landscape; and
at least a receiving part, which comprises an optical rotating device with a vertical axis of rotation and which rotates in synchronism with the optical rotating device of the illuminating part, said receiving part carrying a set of SPAD (single photon avalanche diode) detector arrays, where the diodes are arranged along the vertical direction,
the receiving part also configured to combine data acquired with the set of SPAD detector arrays according to the various rotations of the two optical rotating devices to obtain 3D images of the said at least partial landscape in a central controller,
wherein the optical rotating device of the illuminating part cooperates with a rotating lens group that comprises multiple lenses, adjusted for various focus and size, to collimate at given vertical angles and/or to control the focus of the illuminating beams at different ranges to the landscape, and wherein the receiving part further comprises an optical rotating block comprising multiple lenses adjusted for various focus and size for collecting simultaneously light reflected from targets in plural directions, said set of SPAD positioned behind the rotating block.

2. The imager according to claim 1, wherein the optical rotating device of the receiving part comprises additional means for vertical scanning of the landscape and/or vertically stacked sensors to achieve a high vertical resolution.

3. The imager according to claim 1, wherein the ultra-short laser pulse source comprises at least a laser source of pulses, a modulator for removing some generated pulses and for realizing a tagging of packets of pulses, at least an optical amplifier and/or a doped Erbium fiber amplifier.

4. The imager according to claim 1, wherein the optical rotating device of the illuminating part is optically coupled to the ultra-short laser pulse source with an optical joint.

5. The imager according to claim 4, wherein the optical joint comprises a two lenses set, one of which is optically coupled to the output of the ultra-short laser pulse source and the other is coupled to at least a rotating mirror of the optical rotating device of the illuminating part.

6. The imager according to claim 4, wherein the optical joint comprises a cylindrical mirror which is rotary mounted onto a shaft and a set of lenses which are coupled around the cylindrical mirror each onto a branch of an optical fiber from the ultra-short laser pulse source, all the fibre branches running along a glass tube enclosing the optical joint.

7. The imager according to claim 6, wherein the shaft of the rotating mirror is mounted onto an air bearing.

8. The imager according to claim 6, wherein the shaft cooperates with an internal magnet, an external magnet being magnetically linked to provide alignment of the azimuth of the beam with the set of lenses.

9. The imager according to claim 7, wherein the shaft cooperates with an internal magnet, an external magnet being magnetically linked to provide alignment of the azimuth of the beam with the set of lenses.

10. The imager according to claim 1, wherein the optical rotating device of the receiving part comprises alternatively variously shaped rotating polygonal mirror to acquire data on at least a limited part of the 360° landscape.

11. The imager according to claim 1, wherein the optical rotating block of the illuminating part cooperates with an opto-electrical means as a set of micro-mirror switches to switch the beams on or off synchronously with the scanning of the landscape under a masking controller.

12. The imager according to claim 11, wherein the masking controller cooperates with a fixed laser modulator that handles the distribution of power in a particular angular range.

13. The imager according to claim 1, wherein the optical rotating device of the receiving part comprises means for controlling its rotation synchronously with the optical rotating device of the illuminating part, such that the collected light from the illuminated landscape is accumulated onto a given angle of rotation, with at least a collector comprising lens/detector assemblies with a given angle and/or focus range.

14. The imager according to claim 13, wherein it comprises also a means for control the vertical position of the said at least one collector.

15. The imager according to claim 1, wherein the optical rotating device of the receiving part comprises also alternate 2D image sensors, and is configured to combine 3D data with 2D data acquired in parallel.

16. The imager according to claim 15, wherein the separation of signals for the 2D and the 3D sensors is done by using different wavelengths separated with dichroic filters.

17. The imager according to claim 1, wherein the optical rotating devices of both the illuminating part and the receiving part are combined onto a single shaft driven with a controlled motor, an optical joint with two lenses illuminating a conical mirror with a plurality of lenses which are angularly arranged onto a cylinder affixed onto the said shaft, the lenses transmitting the illuminating beams through an aperture of an enclosure; a set of receiving lenses, mounted onto the cylinder of the transmitting lenses and sending the laser pulses from the illuminated landscape to a set of SPAD detector arrays.

18. The imager according to claim 17, wherein the SPAD detector arrays are mounted onto the same cylinder rotating onto the single shaft, onto a voice-coil to control a vertical movement up and down of both the conical mirror and of the set of SPAD detector arrays, along their vertical direction aligned onto the central axis of the shaft.

19. The imager according to claim 1, wherein the optical rotating devices of both the illuminating part and the receiving part are common, the common optical rotating device comprising a fast rotating polygonal mirror, the output optical fiber of at least an ultra-short power laser pulsed source being optically coupled to a first lens system which transmits illuminating beams toward a first face of the said fast rotating polygonal mirror, directing it through an aperture of an enclosing box of the imager toward the landscape, a half-silvered mirror being arranged with another face of the said polygonal mirror to direct the reflected light from the landscape toward a first and a second SPAD detector array through their corresponding focus optic, the vertical direction of the two SPAD detector arrays being aligned with the axis of rotation of the said fast rotating mirror, the said rotating mirror being driven with a controlled motor.

20. The imager according to claim 19, wherein the two SPAD detector arrays are arranged one above the other in the vertical direction.

21. The imager according to claim 1, wherein it comprises a means for optical multiplexing to enlarge the possibilities of the 3D real-time landscape imager which comprises partially reflecting mirrors in the optical path to let the landscape imager of acquiring 3D data in several directions at the same time.

22. The imager according to claim 21, wherein the partially reflective mirrors have various reflecting shapes comprising: stripes, angled stripes, squares and/or a plurality of curved shapes stacked on top of each other on the same mirror axis.

23. The imager according to claim 1, wherein a RF wireless or optical link is used for bringing power and data to the sensors of the collectors onto the optical rotating device of the receiving part.

24. The imager according to claim 1, further comprising air bearings.

25. The imager according to claim 1, wherein the imager is at least partially enclosed in a sealed enclosure, possibly over-pressured with a neutral gas.

26. The imager according to claim 1, wherein the optical rotating device is rotated onto a motor which is controlled with a PLL designed to speed control with a low jitter single reference point for lowering the mechanical jitter of the optical rotating devices.

27. The imager according to claim 1, wherein further comprising a safety mechanism.

28. The imager according to claim 1, wherein the data detected at the SPAD detector arrays and/or at auxiliary 2D sensors are combined at a means for generating received data, intensity information is combined with the 3D coordinates of each voxel of a 3D representation of the illuminated landscape and such a representation is used onto a 3D display, a 2D display with a graphical unit interface to select a point of view and/or a projection plane, or also a 3D meshed representation useful in a CAD environment.

29. The imager according to claim 1, wherein it comprises at least a local electronic controller supervising the real-time operation of the 3D real-time landscape imager.

30. A set of 3D real-time landscape imagers comprising 3D real-time landscape imagers which comprise:
  at least an illuminating part which is designed to scan at least a portion of the landscape at a given range and having an ultra-short laser pulse source emitting at least one wavelength, and an optical rotating device, with a vertical axis of rotation, and controlled such that packets of pulses are shaped in a pattern of rotating beams sent toward the said at least partial landscape;
  at least a receiving part which comprises an optical rotating device with a vertical axis of rotation and which rotates in synchronism with the optical rotating device of the illuminating part, said optical rotating device carrying a set of SPAD (single photon avalanche diode) detector arrays, where the diodes are arranged along the vertical direction, and the optical rotating device of the receiving part is rotating in synchronism with the optical rotating device of the illuminating part, the receiving part configured to combine data acquired with the set of SPAD detector arrays according to the various rotations of the two optical rotating devices to obtain 3D images of the said at least partial landscape in a central controller,
  wherein said set of 3D real-time landscape imagers comprises a central controller and a high-speed data link for communication of data streams between them and their central controller such that the 3D landscape imagers coordinate their "launching pulse agenda" to avoid simultaneous pulse reflection from the same targets points, and
  wherein the optical rotating device of the illuminating part cooperates with a rotating lens group that comprises multiple lenses, adjusted for various focus and size, to collimate at given vertical angles and/or to control the focus of the illuminating beams at different ranges to the landscape, and
  wherein the receiving part further comprises an optical rotating block comprising multiple lenses adjusted for various focus and size for collecting simultaneously light reflected from targets in plural directions, said set of SPAD positioned behind the rotating block.

31. The set of 3D real-time landscape imagers according to claim 30, wherein the central controller of the set of cooperating 3D real-time landscape imagers comprises a means for controlling the illuminators of the connected 3D landscape imagers which generate tagged packets of laser pulses, and a means for selecting corresponding reflected packets of pulses from each receiver of the cooperating 3D real-time landscape imagers, the central controller configured to combine the 3D data produced at each 3D real-time landscape imager of the set and for producing a global 3D image from the cooperating 3D real-time landscape imagers on the basis of the various positions and orientations of the cooperating 3D landscape imagers.

32. The set of 3D real-time landscape imagers according to claim 31, wherein the central controller comprises a means for implementing of a rough, optically coupled, cooperation protocol using tagged packets of illuminating pulses from each 3D real-time landscape imager.

33. A method of operating a 3D real-time landscape imager, said 3D real-time landscape imager comprising:
  at least an illuminating part which is designed to scan at least a portion of the landscape at a given range and having an ultra-short laser pulse source emitting at least one wavelength, and an optical rotating device, with a vertical axis of rotation, and controlled such that packets of pulses are shaped in a pattern of rotating beams sent toward the said at least partial landscape; and
  at least a receiving part which comprises an optical rotating device, with a vertical axis of rotation and which rotates in synchronism with the optical rotating device of the illuminating part, said optical rotating device carrying a set of SPAD (single photon avalanche diode) detector arrays, where the diodes are arranged along the vertical direction, and the optical rotating device of the receiving part is rotating in synchronism with the optical rotating device of the illuminating part, the receiving part configured to combine data acquired with the set of SPAD detector arrays according to the various rotations of the two optical rotating devices to obtain 3D images of the said at least partial landscape in a central controller,
  wherein said method of operating said 3D real-time landscape imager comprises:
    emitting at least a series of ultra-short power laser pulses of at least a given wavelength, at a given frequency;
    forming the said series of pulses into a plurality of beams which are sent to at least a given area of the landscape with at least a given longitudinal focus position;
    reflecting said formed beams of pulses from the landscape; and
    receiving said reflected pulses onto at least a SPAD detector array, said SPAD detector arrays rotating in synchronism with the emission of said illuminating beams and being arranged to produce detected data on the basis of the knowledge of the round trip delay of the pulses and using the timing coherence of the pulse train for efficiently detecting signals at each SPAD detector cell of the said SPAD detector arrays; and
    processing said detected data to obtain 3D image data, and
  wherein the optical rotating device of the illuminating part cooperates with a rotating lens group that comprises multiple lenses, adjusted for various focus and size, to collimate at given vertical angles and/or to control the focus of the illuminating beams at different ranges to the landscape, and
  wherein the receiving part further comprises an optical rotating block comprising multiple lenses adjusted for various focus and size for collecting simultaneously light reflected from targets in plural directions, said set of SPAD positioned behind the rotating block.

34. The method according to claim 33, wherein, in acquiring 3D data on the 360° landscape around at least a 3D landscape imager very quickly, it comprises a step of acquiring quasi-simultaneously 3D data on the same landscape at different focus by means of rotating parallel sensors and optics, and a step of combining generally those 3D data in a single landscape unified description.

35. The method according to claim 34, wherein it comprises a step of beaming, in quickly rotating sequences, vertical lines of very high peak power, ultra short, ultrahigh peak power IR-light pulse trains on the landscape 3D relief lines and capturing efficiently the reflected lines of photons on ultra-fast in-line equivalent arrays of SPAD sensors at GHz frequency.

36. The method according to claim 33, wherein the step of receiving reflected pulses comprises the step of receiving the reflected light through the use of shaped diffuser on top of the SPAD detectors.

* * * * *